(12) United States Patent
Cao

(10) Patent No.: US 6,553,160 B2
(45) Date of Patent: Apr. 22, 2003

(54) METHOD AND APPARATUS FOR ASYMMETRIC MULTIPLEXING AND DEMULTIPLEXING OF OPTICAL SIGNALS UTILIZING A DIFFRACTION GRATING

(75) Inventor: Simon Xiaofan Cao, Fremont, CA (US)

(73) Assignee: Avanex Corporation, Fremont, CA (US)

( * ) Notice: Subject to any disclaimer, the term of this patent is extended or adjusted under 35 U.S.C. 154(b) by 89 days.

(21) Appl. No.: 09/894,057

(22) Filed: Jun. 28, 2001

(65) Prior Publication Data

US 2003/0002785 A1 Jan. 2, 2003

(51) Int. Cl.[7] .............................. G02B 6/26; G02B 6/42; G02B 6/28; G02B 6/16
(52) U.S. Cl. ............................. 385/24; 385/15; 385/123
(58) Field of Search ............................. 385/24, 15, 123

(56) References Cited

U.S. PATENT DOCUMENTS

| | | | | |
|---|---|---|---|---|
| 5,493,433 A | * | 2/1996 | Prucnal et al. | 359/123 |
| 5,936,752 A | * | 8/1999 | Bishop et al. | 359/124 |
| 6,130,971 A | | 10/2000 | Cao | |
| 6,215,926 B1 | | 4/2001 | Cao | |
| 6,263,126 B1 | | 7/2001 | Cao | |
| 6,263,129 B1 | | 7/2001 | Cao | |
| 6,307,677 B2 | | 10/2001 | Cao | |
| 6,310,690 B1 | | 10/2001 | Cao et al. | |
| 6,396,629 B1 | | 5/2002 | Cao | |
| 6,473,211 B2 | * | 10/2002 | Stone | 359/117 |
| 2002/0005966 A1 | * | 1/2002 | Stone | 359/117 |
| 2002/0009257 A1 | * | 1/2002 | Bouevitch et al. | 385/24 |
| 2002/0055441 A1 | * | 5/2002 | Hata et al. | 508/188 |
| 2002/0154855 A1 | * | 10/2002 | Rose et al. | 385/24 |

* cited by examiner

Primary Examiner—Akm E. Ullah
Assistant Examiner—Tina M Lin
(74) Attorney, Agent, or Firm—Sawyer Law Group LLP

(57) ABSTRACT

An asymmetric de-multiplexer/multiplexer includes: at least a first, second, and third optical fibers; at least one lens optically coupled to the first, second, and third optical fibers; at least one diffraction grating optically coupled to the at least one lens at a side opposite to the first, second, and third optical fibers; and a reflector array optically coupled to the at least one lens at a side opposite to the at least one diffraction grating. The reflector array includes: a substrate, and a plurality of reflectors coupled to the substrate at a side opposite to the at least one lens, where the plurality of reflectors reflects a first subset of channels of a composite optical signal traversing the apparatus, where the subset of channels has irregular inter-channel spacings and non-uniform bandwidths. The apparatus thus is able to overcome bandwidth utilization inefficiencies of conventional regular spaced channel assignment schemes.

17 Claims, 14 Drawing Sheets

200a

METHOD AND APPARATUS FOR ASYMMETRIC MULTIPLEXING AND DEMULTIPLEXING OF OPTICAL SIGNALS UTILIZING A DIFFRACTION GRATING

FIELD OF THE INVENTION

The present invention relates to wavelength division multiplexers and de-multiplexers in optical communications networks and systems. More particularly, the present invention relates to such multiplexers and de-multiplexers that employ diffraction gratings to spatially disperse wavelength multiplexed channels of arbitrary wavelength spacing and band width according to their respective wavelengths.

BACKGROUND OF THE INVENTION

Fiber optic communication systems are becoming increasingly popular for data transmission due to their high speed and high data capacity capabilities. Wavelength division multiplexing is used in such fiber optic communication systems to transfer a relatively large amount of data at a high speed. In wavelength division multiplexing, multiple information-carrying signals, each signal comprising light of a specific restricted wavelength range, may be transmitted along the same optical fiber.

In this document, these individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal."

The term "wavelength," denoted by the Greek letter $\lambda$ (lambda) is used herein synonymously with the terms "signal" or "channel," unless it is used in the expression "physical wavelength," wherein it retains its usual meaning. Although each information-carrying channel actually comprises light of a certain range of physical wavelengths, for simplicity, a single channel is referred to as a single wavelength, $\lambda$, and a plurality of n such channels are referred to as "n wavelengths" denoted $\lambda_1-\lambda_n$. Used in this sense, the term "wavelength" may be understood to refer to "the channel nominally comprised of light of a range of physical wavelengths centered at the particular wavelength, $\lambda$."

Strictly speaking, a multiplexer is an apparatus which combines separate channels into a single wavelength division multiplexed composite optical signal and a de-multiplexer is an apparatus that separates a composite optical signal into its component channels. However, since many multiplexers and de-multiplexers ordinarily operate in either sense, the single term "multiplexer" is usually utilized to described either type of apparatus. Although this liberal usage of the term "multiplexer" is generally used in this specification, the exact operation—either as a multiplexer or a de-multiplexer—of any particular apparatus should be clear from its respective discussion.

A crucial feature of fiber optic networks is the separation of the composite optical signal into its component wavelengths or channels, typically by a wavelength division de-multiplexer. This separation must occur to allow for the exchange of signals between loops within optical communications networks. The exchange typically occurs at connector points, or points where two or more loops intersect for the purpose of exchanging wavelengths. Conventional methods utilized by wavelength division de-multiplexers in separating a composite optical signal into its component channels include the use of filters and fiber gratings as separators. A "channel separator", as used in this specification, is an integrated collection of optical components functioning as a unit which separates one or more channels of a composite optical signal from one another.

Frequently, wavelength division multiplexed fiber-optic communications systems may simultaneously carry different types of data traffic—for example, the simultaneous transmission of voice communications, computer data and video signals. The different types of data generally comprise different data transfer rates. The different data transfer rates are associated with different bandwidth requirements in the fiber-optic communication system. For instance, voice communications involve relatively slow data transfer rates and, consequently, consume relatively little bandwidth. Such low-rate communications can be constrained to low-bandwidth channel slots—that is, they can be allocated to channels occupying relatively small bandwidth—without adverse effects. On the other hand, video communications involve large data transfer rates and therefore consume greater bandwidth. Such communications must be allocated to channels of appropriately wider band width. Finally, computer data are often transmitted through fiber optic and other networks utilizing the well-known SONET protocol. The speed of data transmission depends upon the particular data transmission protocol used by the SONET transmitters and receivers. For instance, data transfer adhering to the OC-48 protocol is transmitted at 2.5 GBit/s whereas data transfer utilizing the OC-192 protocol is transmitted at 10 GBit/s. If such protocols are mixed over a single fiber, they will occupy different natural bandwidths.

The overall available bandwidth of a wavelength-division multiplexed optical fiber system may be utilized most efficiently when the various data streams are allocated to channels comprising bandwidths appropriate to or matched to their respective data transfer rates. This type of allocation necessitates uneven or asymmetric channel spacing and non-uniform bandwidths. Otherwise, as is conventionally done, all channels must be assigned to a regular spacing and uniform bandwidth. This conventional channel assignment scheme is wasteful of bandwidth when different signal types or protocols are transmitted simultaneously, since all channels must be allocated a bandwidth corresponding to the highest data rate transfer.

Accordingly, there exists a need for an asymmetric channel separator. The separator should separate or combine optical channels comprising arbitrary spacing and non-uniform bandwidths so as to overcome the above mentioned limitations of conventional channel assignment schemes. The present invention addresses such a need.

SUMMARY OF THE INVENTION

An asymmetric de-multiplexer/multiplexer includes: at least a first, second, and third optical fibers; at least one lens optically coupled to the first, second, and third optical fibers; at least one diffraction grating optically coupled to the at least one lens at a side opposite to the first, second, and third optical fibers; and a reflector array optically coupled to the at least one lens at a side opposite to the at least one diffraction grating. The reflector array includes: a substrate, and a plurality of reflectors coupled to the substrate at a side opposite to the at least one lens, where the plurality of reflectors reflects a first subset of channels of a composite optical signal traversing the apparatus, where the subset of channels has irregular inter-channel spacings and non-uniform bandwidths. The apparatus thus is able to overcome bandwidth utilization inefficiencies of conventional regular spaced channel assignment schemes.

DETAILED DESCRIPTION

The present invention provides an asymmetric channel separator. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

To more particularly describe the features of the present invention, please refer to FIGS. 1 through 5 in conjunction with the discussion below.

Figure 1:
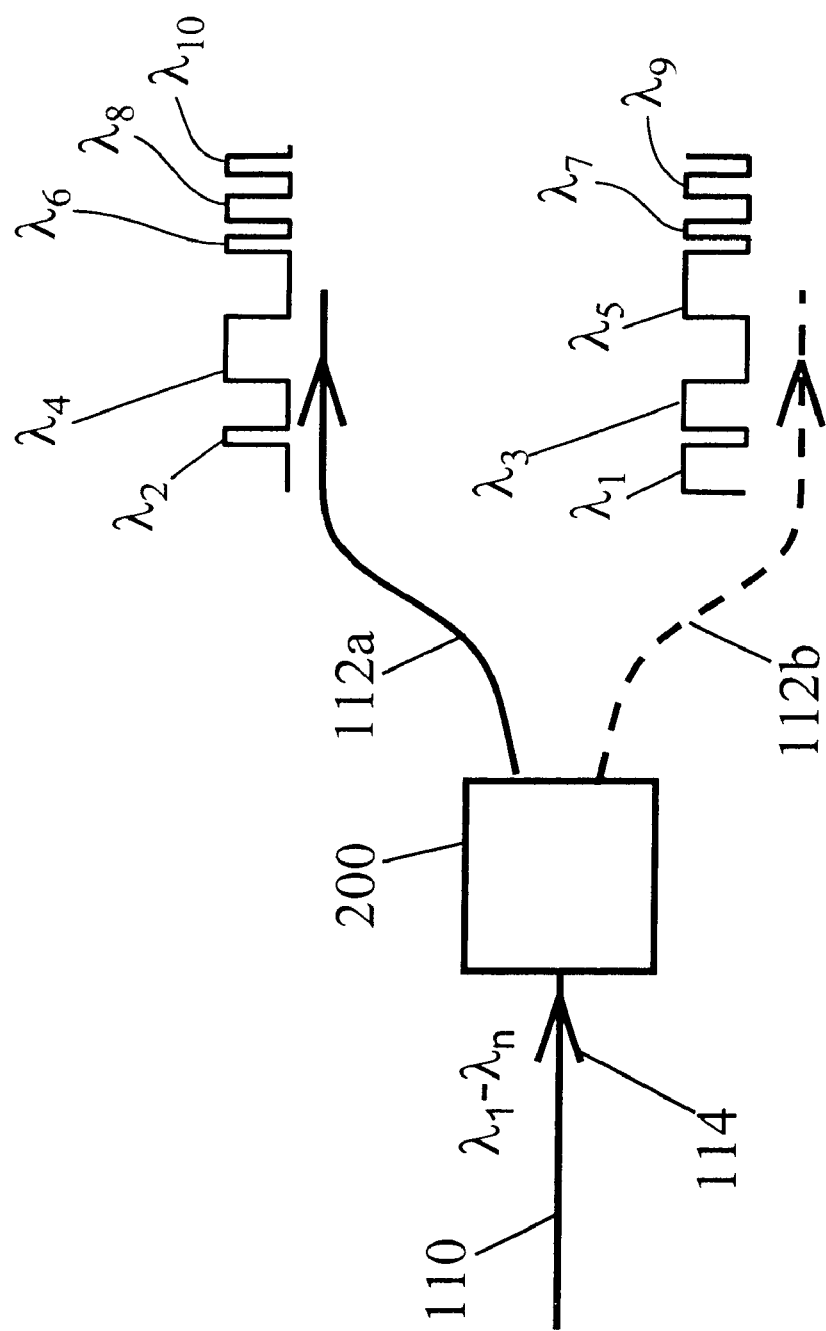
FIG. 1 illustrates the operation of an asymmetric channel separator in accordance with the present invention.

FIG. 1 illustrates the operation of an asymmetric channel separator in accordance with the present invention. The asymmetric channel separator 200 receives an optical input through input line 110. The optical input light 114 encompasses the range of wavelengths $\lambda_1$ through $\lambda_n$. Typically, the optical input will comprise n optical channels, denoted $\lambda_1, \lambda_2, \ldots, \lambda_n$ wherein each such channel $\lambda_i$ carries an optical signal and comprises light centered about the physical wavelength $\lambda_i$ and wherein the physical wavelength spacing $\Delta\lambda_i$ between each adjacent pair of channels is arbitrary. In the foregoing, the quantity $\Delta\lambda_i$ is defined by $\Delta\lambda_i = \lambda_{i+1} - \lambda_i$. The asymmetric channel separator 200 separates the input light into two outputs 112a–112b along separate respective paths. The first output 112a comprises the "even" channels $\lambda_2, \lambda_4, \lambda_6, \ldots$ and the second output 112b comprises the "odd" channels $\lambda_1, \lambda_3, \lambda_5, \ldots$ In the example of the operation of an asymmetric channel separator according to the present invention shown in FIG. 1, the input comprises the ten arbitrarily spaced channels $\lambda_1$ through $\lambda_{10}$ and the first output 112a comprises the five even channels $\lambda_2, \lambda_4, \lambda_6, \lambda_8$ and $\lambda_{10}$ and the second output 112b comprises the five odd channels $\lambda_1, \lambda_3, \lambda_5, \lambda_7$ and $\lambda_9$. More generally, however, if the separator 100 receives a continuum of physical wavelengths comprising a uniform power density, then the separator 100 produces a first output light 112a comprising a first subset of the physical wavelengths and a second output light 112b comprising a second subset of the physical wavelengths. The first subset of physical wavelengths comprising the first output light 112a comprises a plurality of pass bands of arbitrary position and width. The second subset of physical wavelengths comprising the second output light 112b comprises a plurality of pass bands whose positions coincide with the isolation bands of the first output. Thus the first output 112a and the second output 112b are complementary to one another.

Figure 2A:
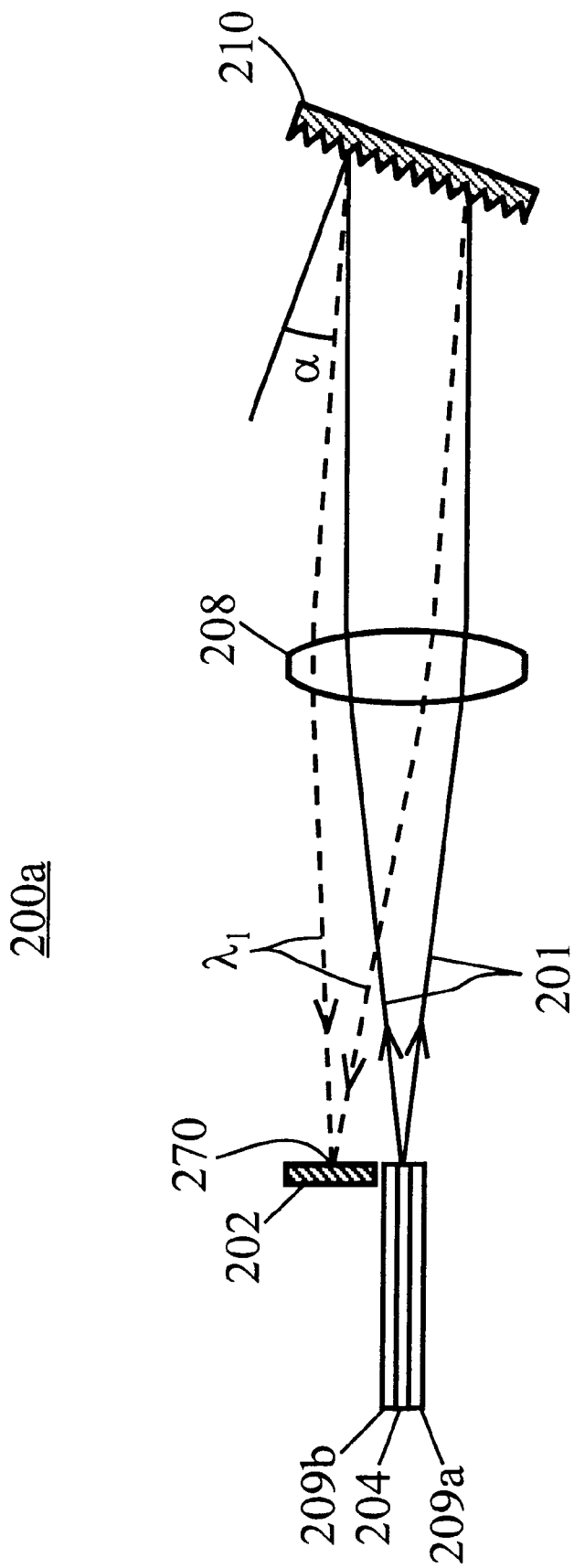
FIGS. 2a–2c illustrate a first preferred embodiment of an asymmetric channel separator in accordance with the present invention.
Figure 2B:
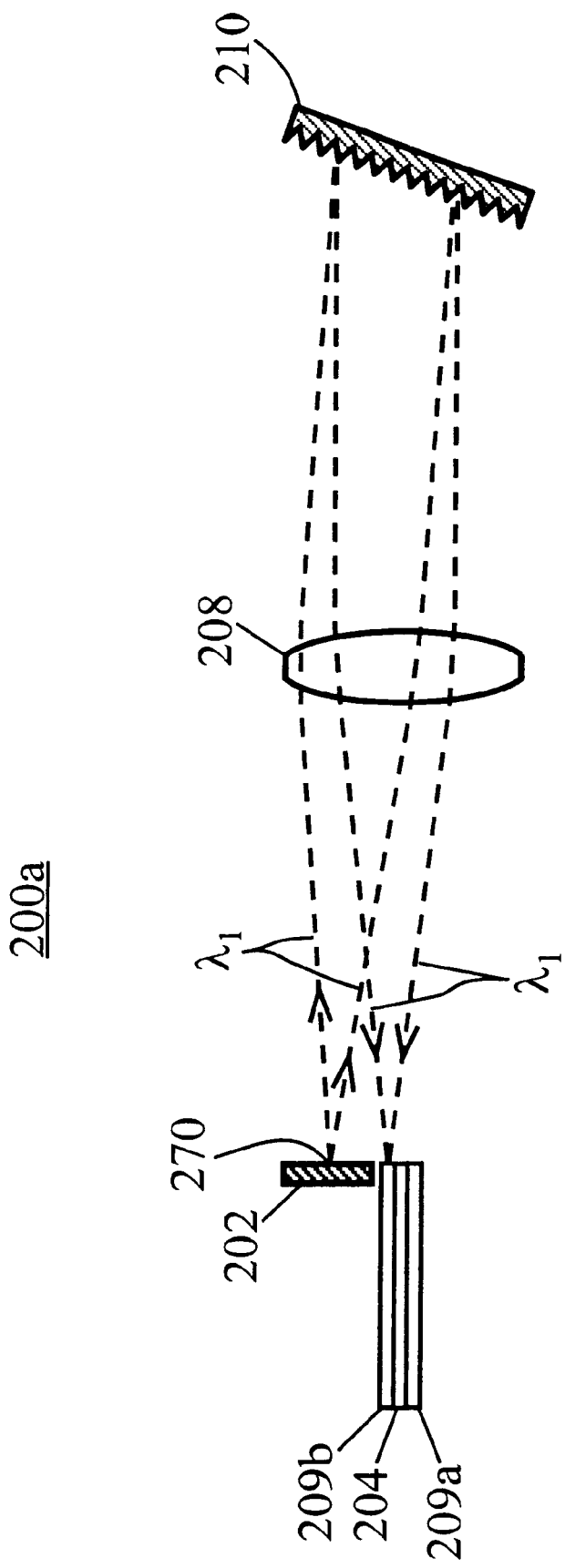
Figure 2C:
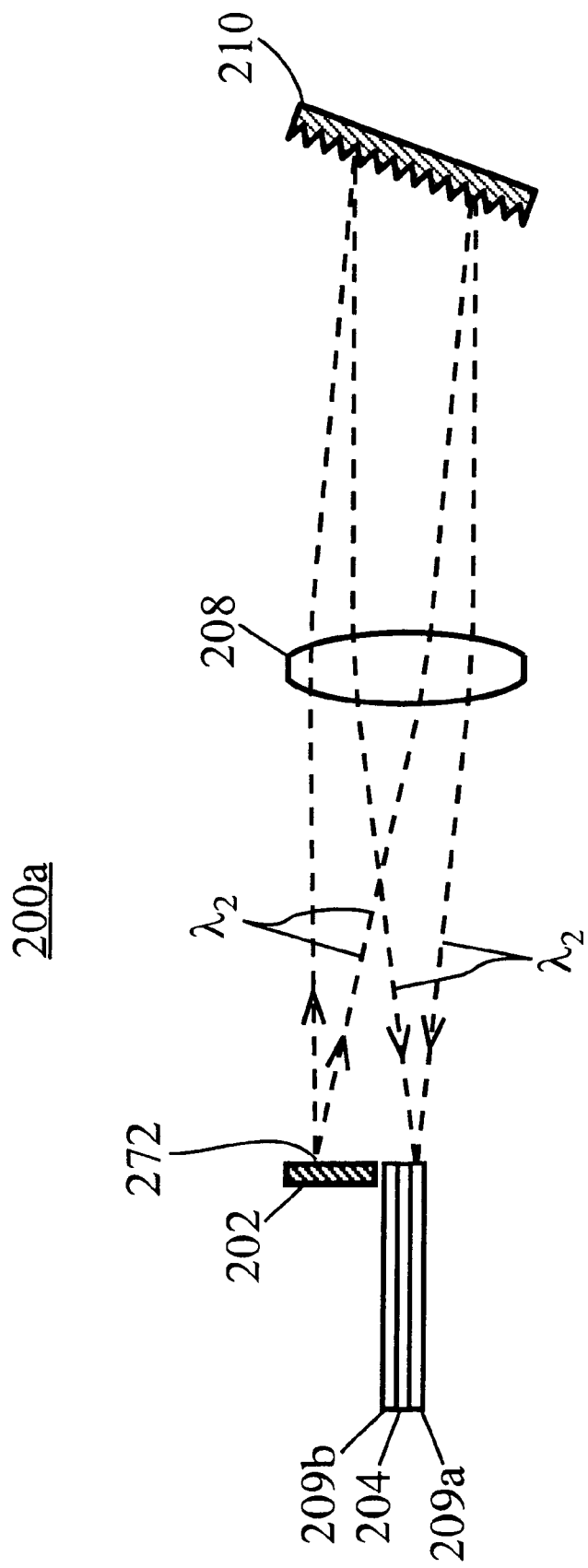

FIGS. 2a–2c illustrate a first preferred embodiment of an asymmetric channel separator in accordance with the present invention. The asymmetric channel separator 200a illustrated in FIGS. 2a–2c comprises an input fiber 204, output fibers 209a–209b, a lens 208, a diffraction grating 210 and a reflector array 202. The lens 208 may be a simple lens or may comprise a lens assembly—that is, it may comprise a composite lens.

When the asymmetric channel separator 200a is utilized as a de-multiplexer, the fiber 204 inputs a composite optical signal to the separator 200a and the fibers 209a–209b each output a subset of channels from the separator 200a. When the asymmetric channel separator 200a is utilized as a multiplexer, the input and output roles of the fibers are reversed, such that the fiber 209a inputs a first set of channels, the fiber 209b inputs a second set of channels, and the fiber 204 outputs the combined first and second sets of channels from the separator 200a. Only the de-multiplexer operation is described in the following discussions.

In de-multiplexer operation, a composite optical signal 201 comprising a plurality of channels of arbitrary physical wavelengths and band widths is input to the separator 200a from input fiber 204 (FIG. 2a). After leaving the input fiber 204, the light comprising the composite optical signal 201 diverges. The light comprising composite optical signal 201 is then collimated by lens 208 onto diffraction grating 210. The diffraction grating 210 spatially disperses, one from another, the various wavelengths comprising composite optical signal 201. The path of one particular wavelength, $\lambda_1$, from the grating 210 to the reflector array 202 is shown as a dashed line in FIG. 2a. The collimated light comprising wavelength $\lambda_1$ diffracts from grating 210 at an angle $\alpha$. This collimated light then passes through lens 208, by which it is focused onto reflector array 202 at point 270. Channels comprising physical wavelengths that are longer and shorter than $\lambda_1$ will diffract from grating 210 at angles that are greater than and lesser than $\alpha$, respectively, and will therefore focus on reflector array 202 at points above and below.the point 270, respectively. For instance, FIG. 2c shows that light comprising second wavelength $\lambda_2$ focuses on reflector array 202 at a point 272 offset from point 270.

After reflecting from the reflector array 202, light comprising a first wavelength $\lambda_1$ follows a path, through the separator 200a, to the second output fiber 209b as shown in FIG. 2b. As will be described in more detail with reference to FIG. 3, the reflector array 202 reflects other odd channels $\lambda_3, \lambda_5$, etc. so that these channels also travel to output fiber 209b. The path, through the separator 200a, of light comprising a second wavelength $\lambda_2$ is shown in FIG. 2c. The channel $\lambda_2$ as well as other even channels $\lambda_4, \lambda_6$, etc. are reflected by the reflector array 202 so as to travel to the first output fiber 209a.

Figure 3:
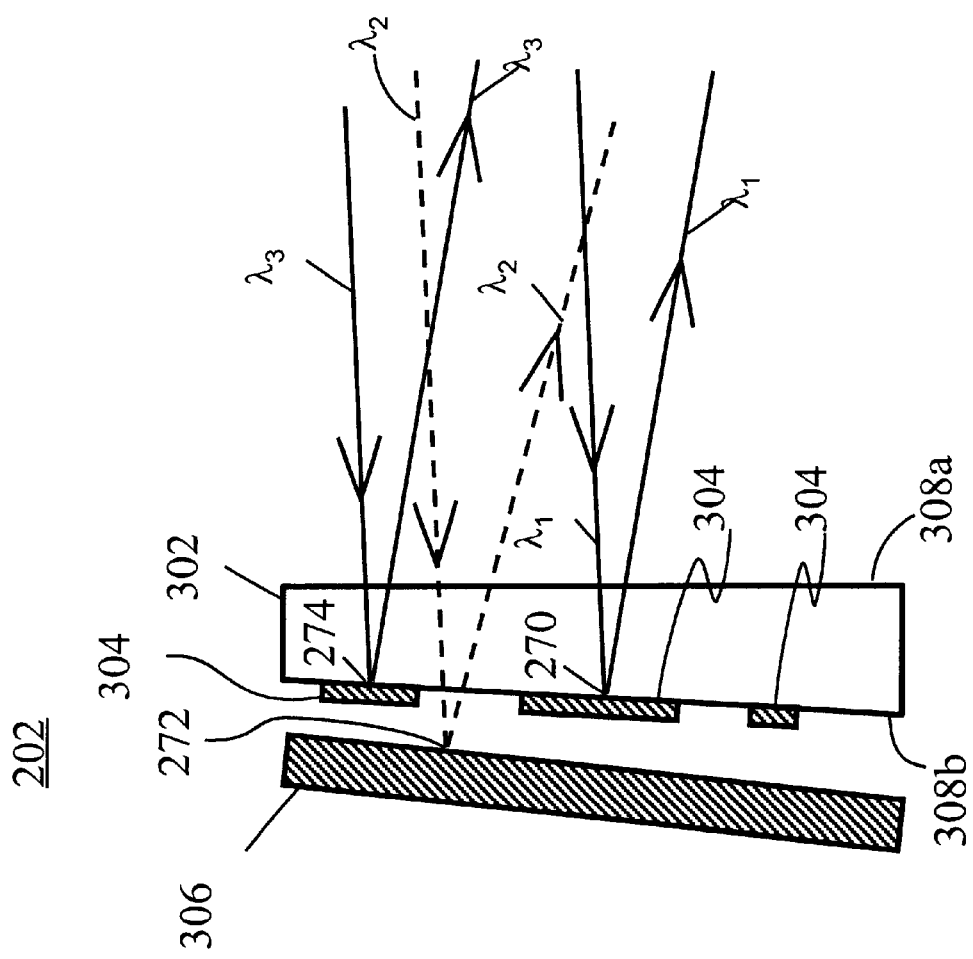
FIG. 3 illustrates an enlarged view showing the construction of a reflector array utilized within the first preferred embodiment of an asymmetric channel separator in accordance with the present invention.

FIG. 3 shows an enlarged view of the reflector array 202 utilized in the asymmetric channel separator 200a. The reflector array 202 comprises a plurality of first reflectors 304 disposed upon a substrate plate 302, preferably comprising glass, and at least one second reflector 306. The first reflectors 304 comprise strips of a reflective material, such as metal, bonded or coated onto the rear face 308b of the substrate plate 302. Less desirably, the first reflectors 304 could alternatively be disposed upon the front face 308a of the substrate plate 302. The second reflector 306 also comprises a highly reflective surface, such as a mirror. The front face 308a of the substrate plate 302 faces the grating 210. The rear face 308b of the substrate plate 302 and the first reflectors 304 disposed thereupon are oriented at an angle such that signal light reflected from the first reflectors 304 returns through the separator 200a to the second output fiber 209b as shown in FIG. 2b. The second reflector 306 is oriented at an angle such that signal light reflected from the second reflector 306 returns through the separator 200a to the first output fiber 209a as shown in FIG. 2c.

The first reflectors 304 are disposed at positions along the rear face 308b of substrate plate 302 so as to only reflect light comprising the odd channels. The light comprising the remaining even channels passes directly through the gaps between the first reflectors 304 so as to travel to the second reflector 306 and reflect therefrom. More particularly, the light comprising each channel focuses or approximately focuses at a certain point. For instance, the channel $\lambda_1$ focuses at or approximately at point 270; the channel $\lambda_2$ focuses at or approximately at point 272 and the channel $\lambda_3$ focuses at or approximately at point 274. The first reflectors 304 are disposed on the rear face 308b only at the foci or approximate foci of the odd channels $\lambda_1$, $\lambda_3$, etc., thereby causing these odd channels to travel to the second output fiber 209b. The even channels pass through the gaps between the first reflectors, reflect from the second reflector 306 and return back through the gaps between the first reflectors so as to travel to the first output fiber 209a in the fashion described above.

The positions and widths of the first plurality of reflectors 304, as disposed upon the rear face 308b of the substrate plate 302, determine which output fiber 209a–209b receives light comprising any particular physical wavelength. Therefore, the positions and widths of the first plurality of reflectors 304 determine the band position and bandwidth characteristics of the optical pass bands through the separator 200a to either the first fiber 209a or the second fiber 209b. Because any wavelength not reflected by any one of the first reflectors 304 is reflected by the second reflector 306, the pass bands associated with the first output fiber 209a and the second output fiber 209b are complementary to one another—that is, a wavelength corresponding to a pass band for one output fiber corresponds to a stop or isolation band for the other output fiber, and vice versa. In this way, the first subset of channels directed to the first output fiber 209a and the second subset of channels directed to the second output fiber 209b are interleaved with one another. In this fashion, the separator 200a functions as an asymmetric channel separator. It should be clear to one of ordinary skill in the art that the separator 200a may be utilized as either a multiplexer or a de-multiplexer.

FIGS. 4a–4d each illustrate both a top view and a side view of a second preferred embodiment of an asymmetric channel separator in accordance with the present invention. The asymmetric channel separator 200b (FIGS. 4a–4d) is designed so as to compensate for any polarization-dependent loss introduced by a diffraction grating. This compensation is accomplished by providing an apparatus whereby all signal light input to the grating is linearly polarized in an orientation for which the grating has maximum efficiency. Frequently, diffraction gratings possess maximum efficiency for light polarized with the TM polarization, in which the electric vector of the light is perpendicular to the grating grooves. However, depending upon many factors, including the light wavelength, the grating groove spacing, etc., the grating efficiency is sometimes greater for light having the TE polarization, in which the electric vector is parallel to the grating grooves.

If unpolarized light is input to a diffraction grating, then the component of the light having the optimal polarization will be diffracted with maximum efficiency, but a portion of the light component having non-optimal polarization will be lost as a result of the reduced diffraction efficiency for that component. However, the overall grating efficiency of the grating may be improved by converting all light to the polarization for which the grating efficiency is maximum. The asymmetric channel separator 200b illustrated in FIGS. 4a–4d accomplishes such a polarization conversion. In the following discussion related to FIGS. 4a–4d, it is assumed that the grating efficiency is maximum for TM polarized light and thus light is introduced to the grating with such polarization. However, one of ordinary skill in the art will understand how to modify the separator 200b for use with a diffraction grating having maximum efficiency for light with TE polarization. Circles with inscribed double-barbed arrows or crosses adjacent to signal light paths represent the polarization of such signal lights as they propagate through the separator 200b of FIGS. 4a–4d. A cross indicates light polarized perpendicular or into the plane of the drawing. A double-barbed arrow indicates light polarized within the plane of the drawing in the indicated direction. Circles with a superimposed double-barbed arrow and a cross signify unpolarized, mixed polarized or randomly polarized light.

Figure 4A:
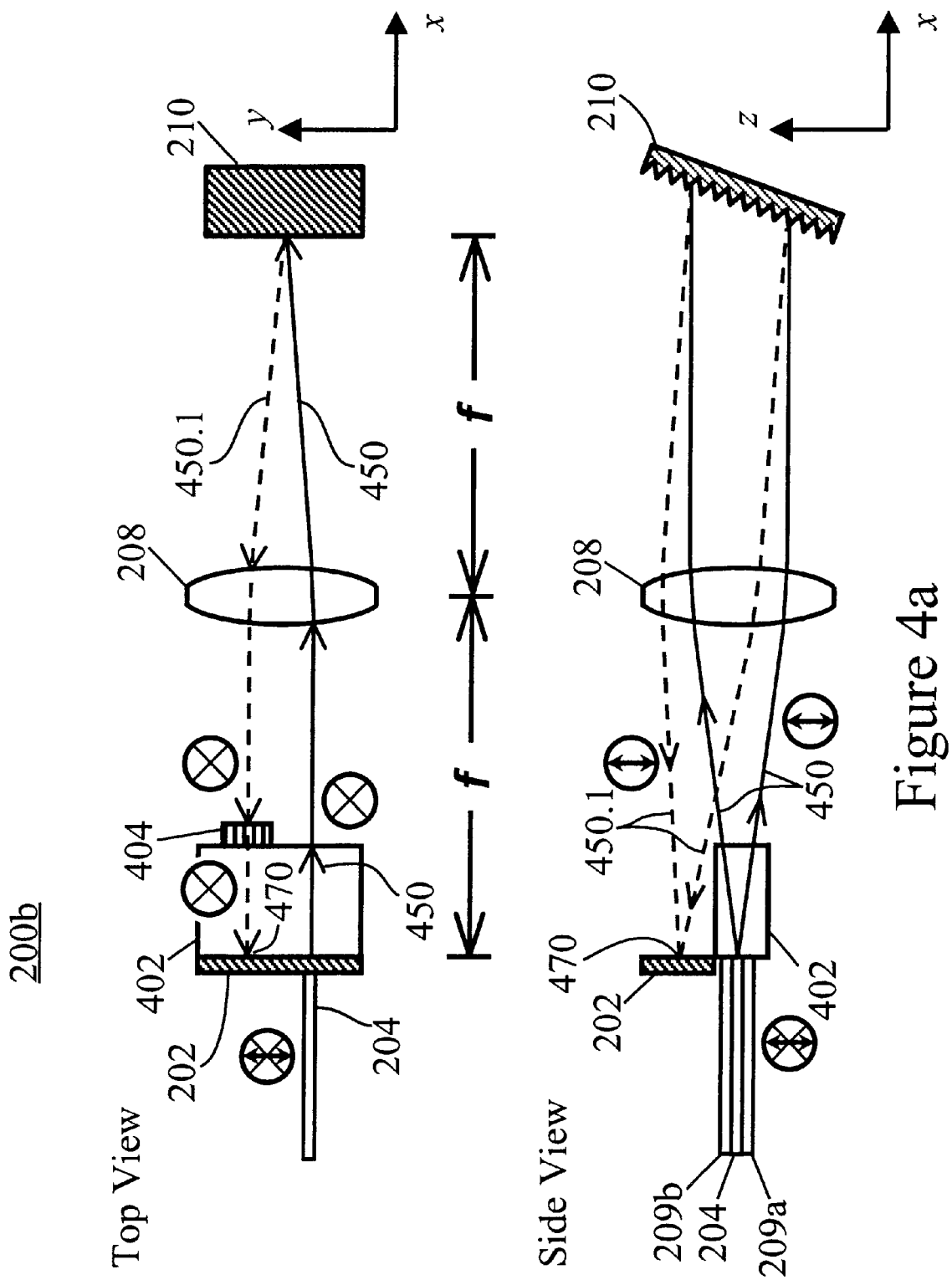
FIGS. 4a–4d illustrate a second preferred embodiment of an asymmetric channel separator in accordance with the present invention.
Figure 4B:
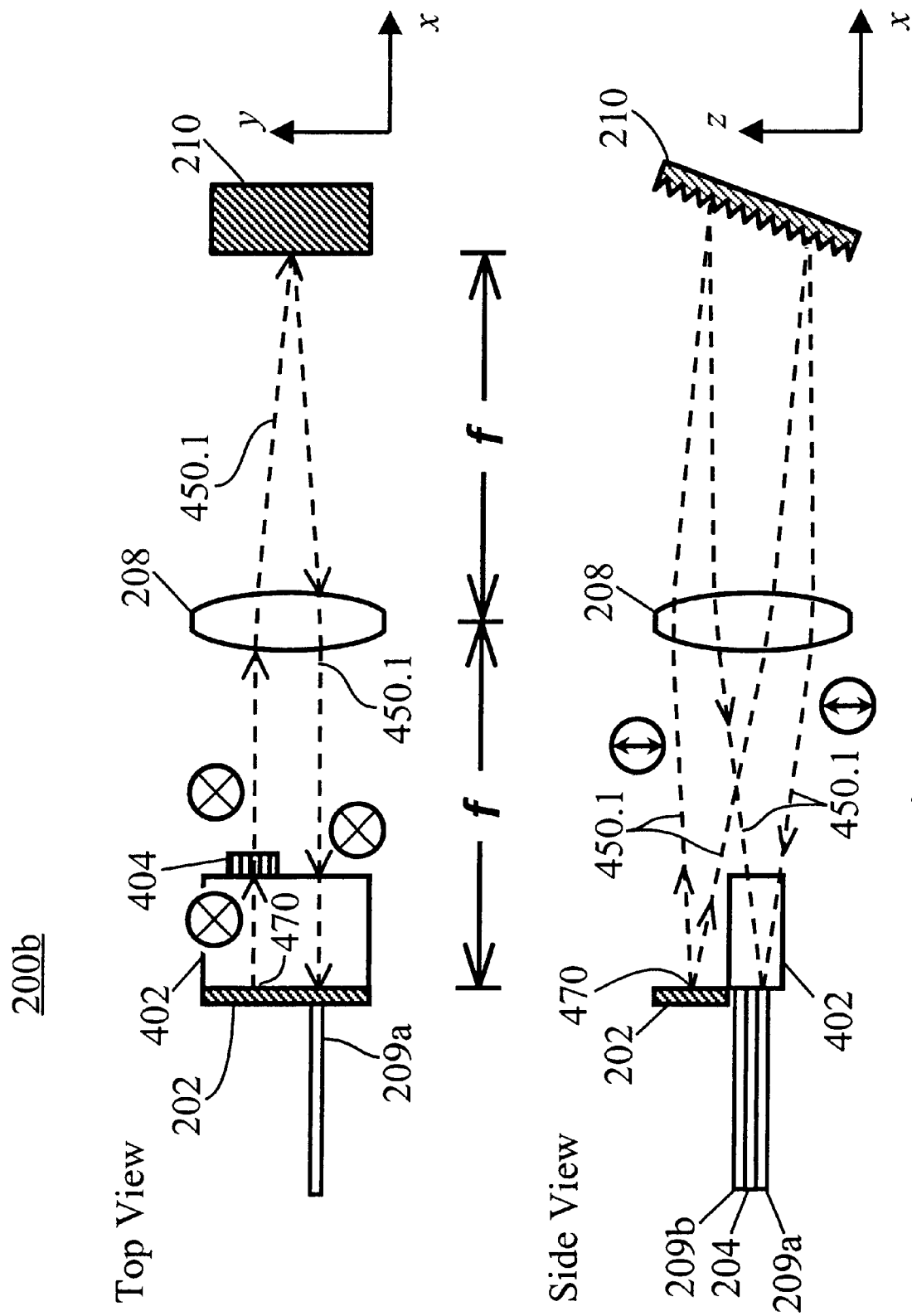
Figure 4C:
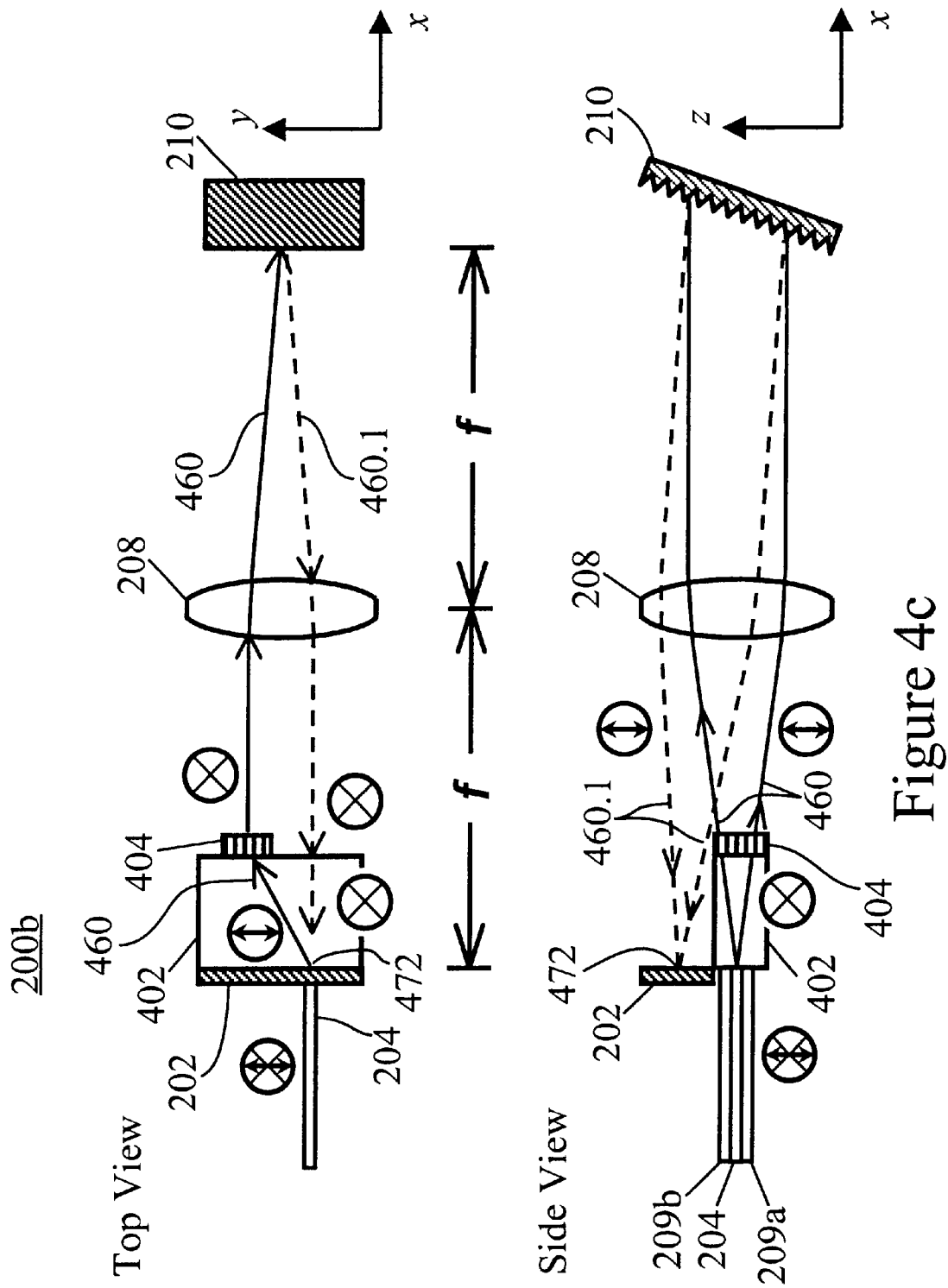

The asymmetric channel separator 200b shown in FIGS. 4a–4d comprises all the same components as in the asymmetric channel separator 200a (FIGS. 2a–2c). These common components have similar dispositions and functions within the two asymmetric channel separators 200a–200b. Additionally, the asymmetric channel separator 200b further comprises a birefringent walk-off plate 402 and a 90° optical rotator 404. Preferably the optical rotator 404 comprises a half-wave plate but may comprise a liquid crystal or other optically rotating component. In the asymmetric channel separator 200b, the input fiber 204 and the two output fibers 209a–209b are optically coupled to the birefringent walk-off plate 402. The birefringent walk-off plate 402 has the property of causing a physical separation of unpolarized light input thereto into two sub-lights of mutually orthogonal linear polarizations. This physical separation is illustrated for an input composite optical signal by comparison between the pathways of light emanating from input fiber 204 in the upper drawings of FIG. 4a and FIG. 4c, which present top views of the asymmetric channel separator 200b. As seen by comparison of FIGS. 4a with FIG. 4c, an unpolarized light input from fiber 204 is separated within the birefringent walk-off plate 402 into a first sub-light 450 comprising a linearly polarized o-ray (FIG. 4a) and a second sub-light comprising a linearly polarized e-ray 460 (FIG. 4c). Each of the sub-lights 450 and 460 comprises all the same wavelengths as in the original composite optical signal input from fiber 204. Thus, each of the sub-lights 450 and 460 is also a composite optical signal. Since it comprises an e-ray within birefringent plate 402, the horizontally polarized composite optical signal 460 is deflected or laterally offset by the well-known birefringent walk-off effect. The vertically polarized composite optical signal 450, which comprises an o-ray within birefringent plate 402, is not deflected.

The birefringent walk-off plate 402 is further optically coupled to the 90° optical rotator 404 and to the lens 208. The lens 208 is optically coupled to both the optical rotator 404 and the birefringent walk-off plate 402 such that only one of the sub-lights 450 and 460 passes from the birefringent walk-off plate 402, through the optical rotator 404 and thence to the lens 208. The other one of the sub-lights passes directly from the birefringent walk-off plate 402 to the lens 208. The lens 208 is disposed substantially at a distance f from the ends of the fibers 204, 209a and 209b, where f is the focal length of lens 208. Also, the diffraction grating 210 is optically coupled to the lens 208 substantially at a distance f from the lens 208 on the opposite side of the lens 208 from the birefringent walk-off plate 402 and the optical rotator 404.

The asymmetric channel separator 200b (FIGS. 4a–4d) can be utilized either as a multiplexer or a de-multiplexer. Only the operation of asymmetric channel separator 200b as a de-multiplexer is described herein in detail. In such operation (FIGS. 4a–4d), a composite optical signal comprised of unpolarized, randomly polarized or mixed polarized light is input to the asymmetric channel separator 200b from the input fiber 204. The composite optical signal diverges as it leaves the fiber 204 and, upon passing through birefringent plate 402, is separated into a vertically polarized composite optical signal 450 (FIG. 4a) and a horizontally polarized composite optical signal 460 (FIG. 4c).

After passing through the birefringent walk-off plate 402, the offset composite optical signal 460 passes through the 90° optical rotator 404 and, therefore, the linearly polarized light comprising composite optical signal 460 experiences a 90° rotation of the orientation of its polarization plane. After the composite optical signal 460 passes through the reciprocal optical rotator 404, the two composite optical signals 450 and 460 are similarly polarized in the vertical direction so as to be perpendicular to the horizontally oriented grooves of grating 210.

After passing through the birefringent walk-off plate 402 and the reciprocal optical rotator 404, both composite optical signals 450 and 460 pass through the lens 208, which collimates the light of both signals and directs both signals onto the grating 210. Through diffraction, the grating 210 spatially separates and disperses the various channels comprising composite optical signals 450 and 460 according to their respective wavelengths. The path of the portion 450.1 of wavelength $\lambda_1$ separated from the first sub-light 450 is illustrated by dashed lines in FIGS. 4a–4b. The path of the portion 460.1 of the same wavelength $\lambda_1$ separated from the second sub-light 460 is illustrated by dashed lines in FIGS. 4c–4d.

Because the "grooves" of grating 210 are disposed horizontally, the dispersion plane of the grating 210 is disposed vertically. After diffraction, the separated individual wavelengths are propagated back towards and through the lens 208 and focused onto the reflector array 202 as shown FIG. 4a and FIG. 4c. For clarity, only the paths of only one such wavelength, $\lambda_1$, are shown.

Figure 4D:
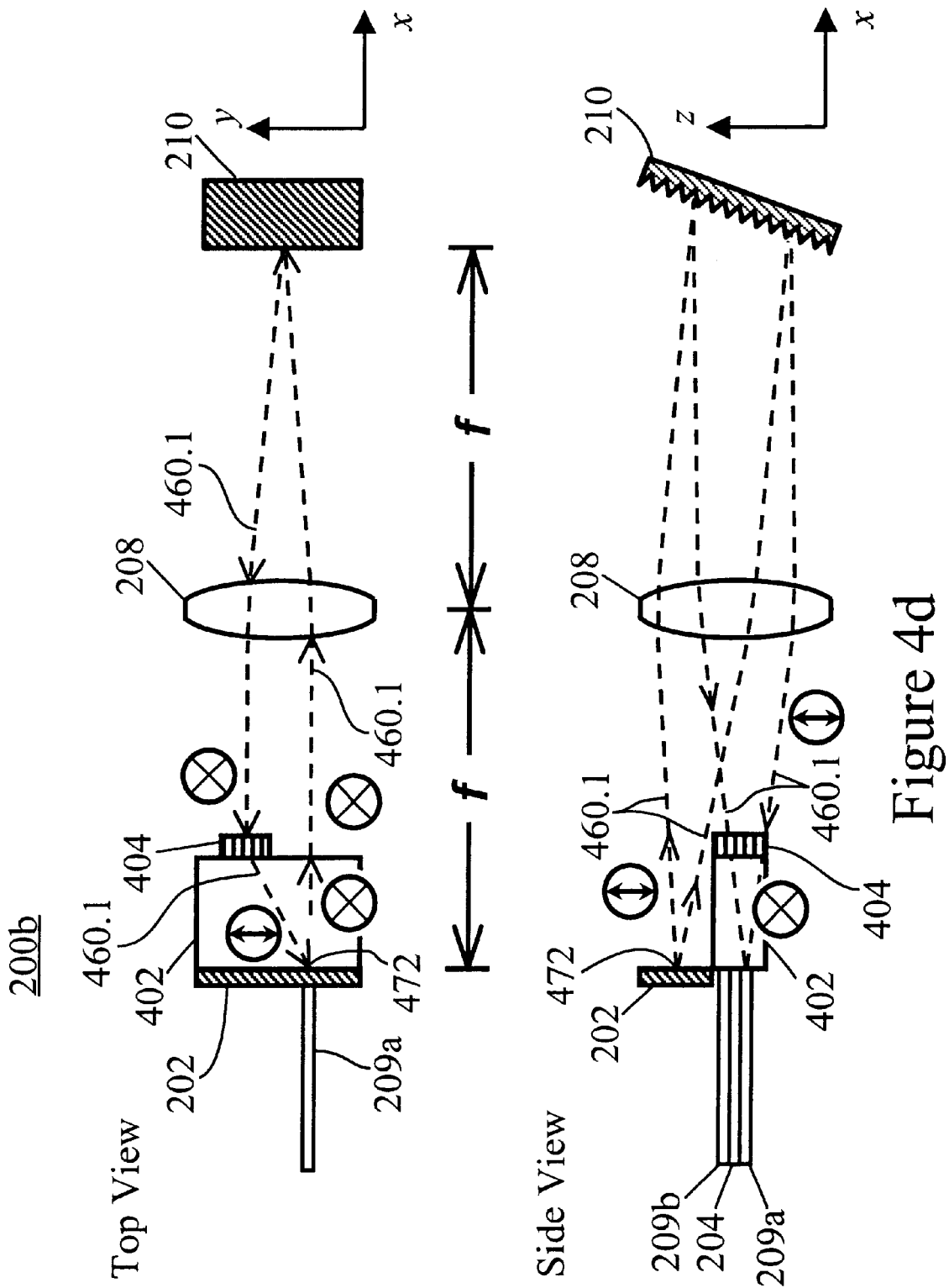

The returning portions 450.1 and 460.1 of the wavelength $\lambda_1$ are focused by lens 208 onto the reflector array 202. Portion 450.1 focuses at point 470 (FIG. 4a) and portion 460.1 focuses at point 472 (FIG. 4c). Signals comprising other wavelengths would each also focus to two points either above or below the points 470–472. After reflecting from the reflector array 202, the portions 450.1 and 460.1 of the light of wavelength $\lambda_1$ approximately re-trace their paths as shown in FIG. 4b and FIG. 4d, respectively. However, as discussed previously in reference to the operation of the asymmetric channel separator 200a, the reflection of $\lambda_1$ from the reflector array 202 is such that the return paths lead to the output fiber 209a.

As illustrated in FIG. 4b, the portion 450.1 of the light of wavelength $\lambda_1$ passes through lens 208 a third time, diffracts from grating 210 a second time, passes through lens 208 a fourth time, passes through birefringent plate 402 a second time and finally focuses onto the end of fiber 209a. As illustrated in FIG. 4d, the other portion 460.1 of the light of wavelength $\lambda_1$ passes through lens 208 a third time, diffracts from grating 210 a second time, passes through lens 208 a fourth time, passes through both the 90° optical rotator 404 and the birefringent plate 402 a second time and finally focuses onto the end of fiber 209a. Upon passing through the 90° optical rotator 404, the polarization plane of the lights comprising the portion 460.1 is rotated by 90° so as to become horizontal. This horizontally polarized light 460.1 then comprises an e-ray within the birefringent walk-off plate 402 and is thus deflected or offset upon passing therethrough (FIG. 4d). The light comprising the portion 450.1 does not pass through the optical rotator 404 and thus its polarization plane is not rotated (FIG. 4b). This vertically polarized light 450.1 thus passes through the birefringent walk-off plate 402 as an undeflected o-ray.

The two portions 450.1 and 460.1, comprising the same wavelength $\lambda_1$, become combined into one signal upon passing through the birefringent walk-off plate 402. This combined signal then focuses onto the output fiber 209a. The focusing is accomplished by the focusing properties of the lens 208. In this fashion, the separator 200b functions as a de-multiplexer.

Figure 5:
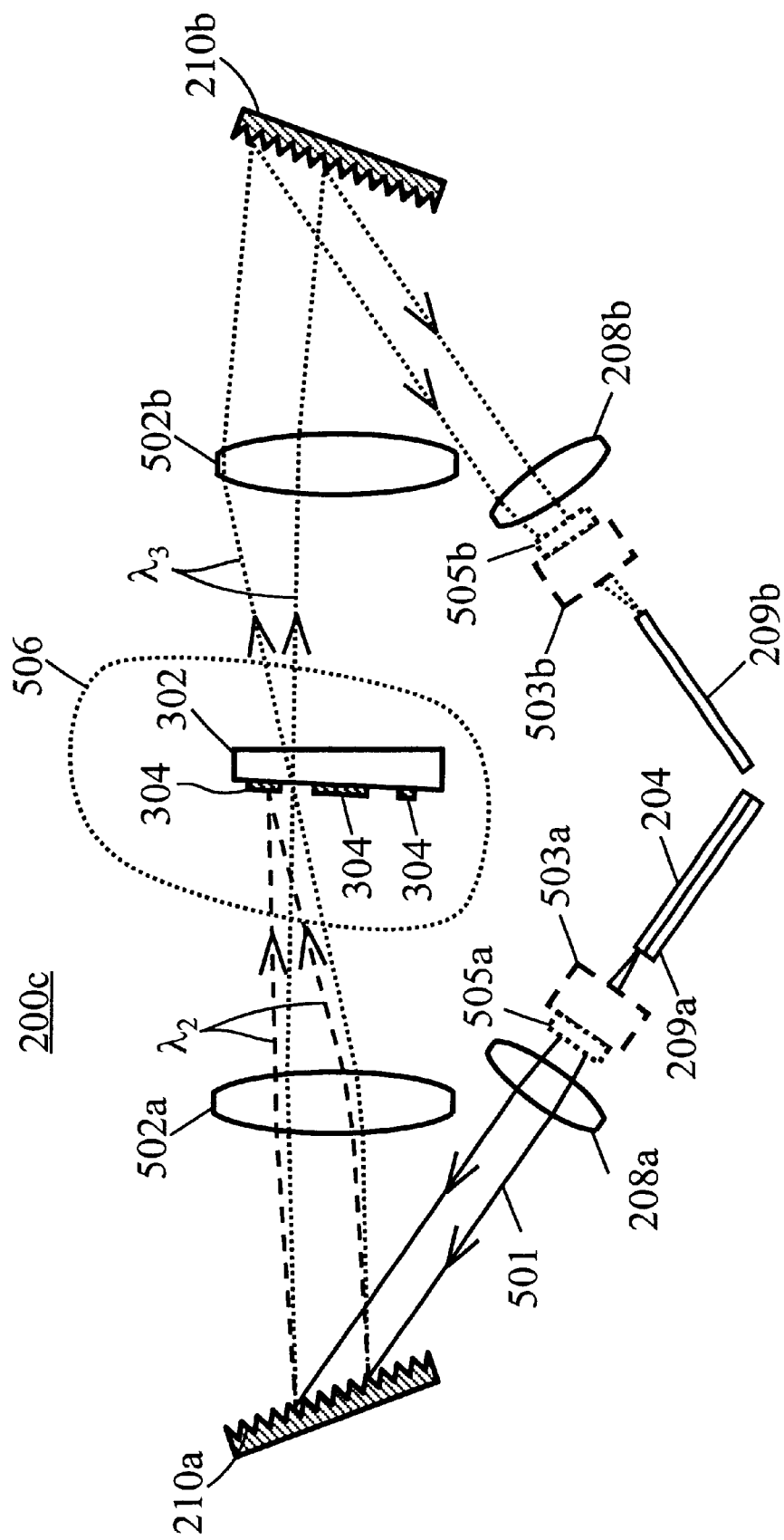
FIG. 5 illustrates a third preferred embodiment of an asymmetric channel separator in accordance with the present invention.
Figure 6A:
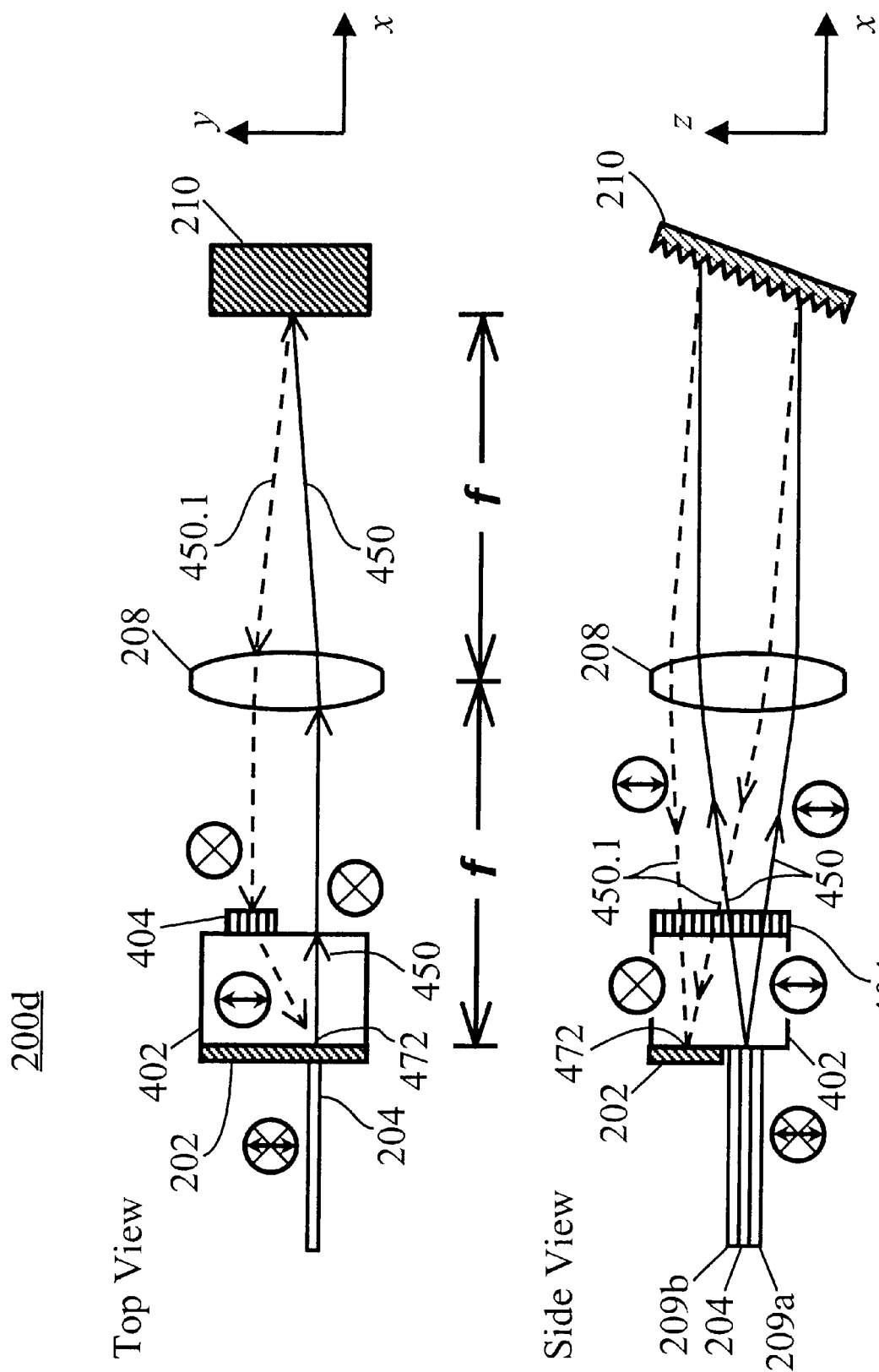
FIGS. 6a–6d illustrate a fourth preferred embodiment of an asymmetric channel separator in accordance with the present invention.
Figure 6B:
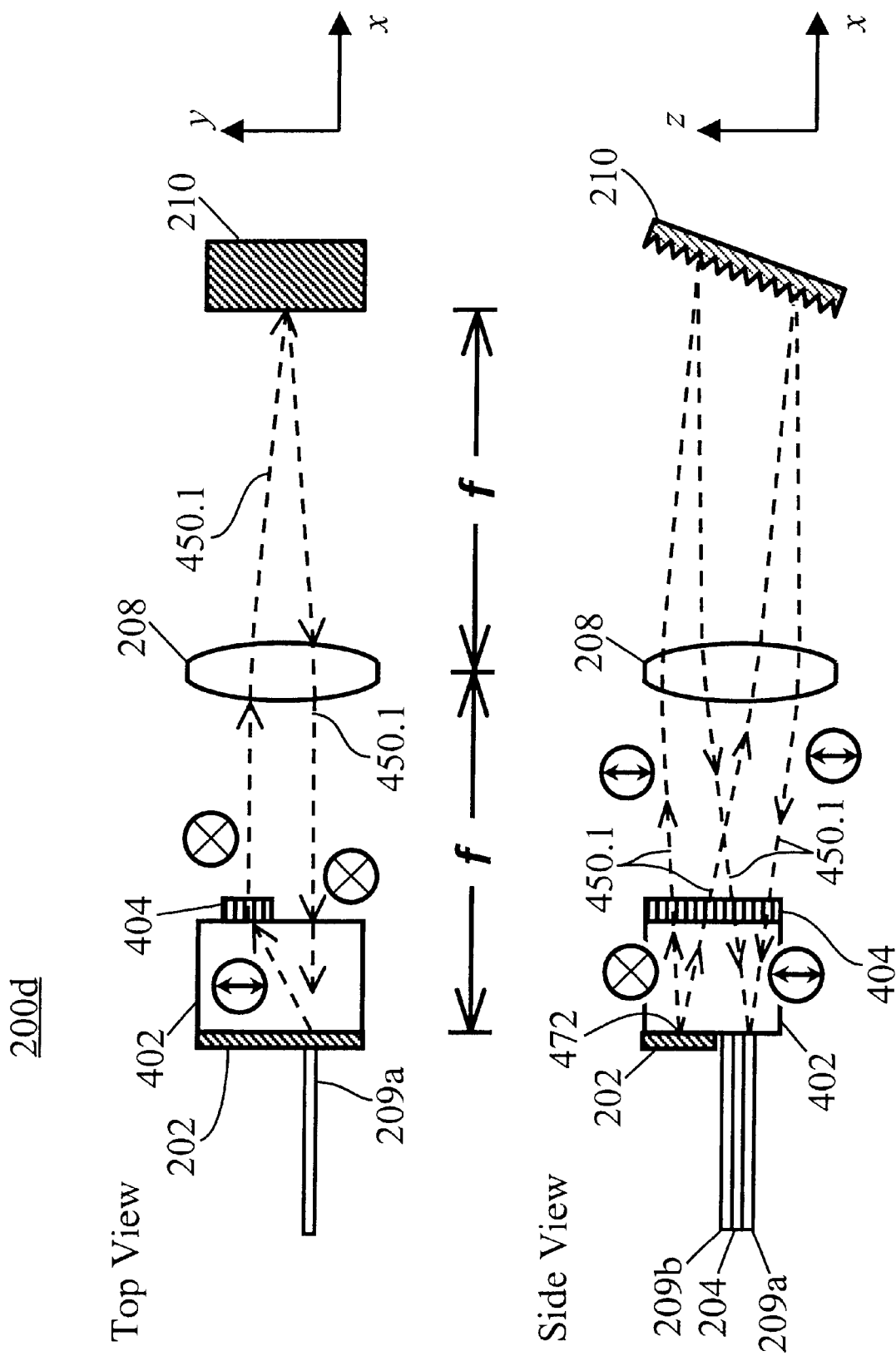
Figure 6C:
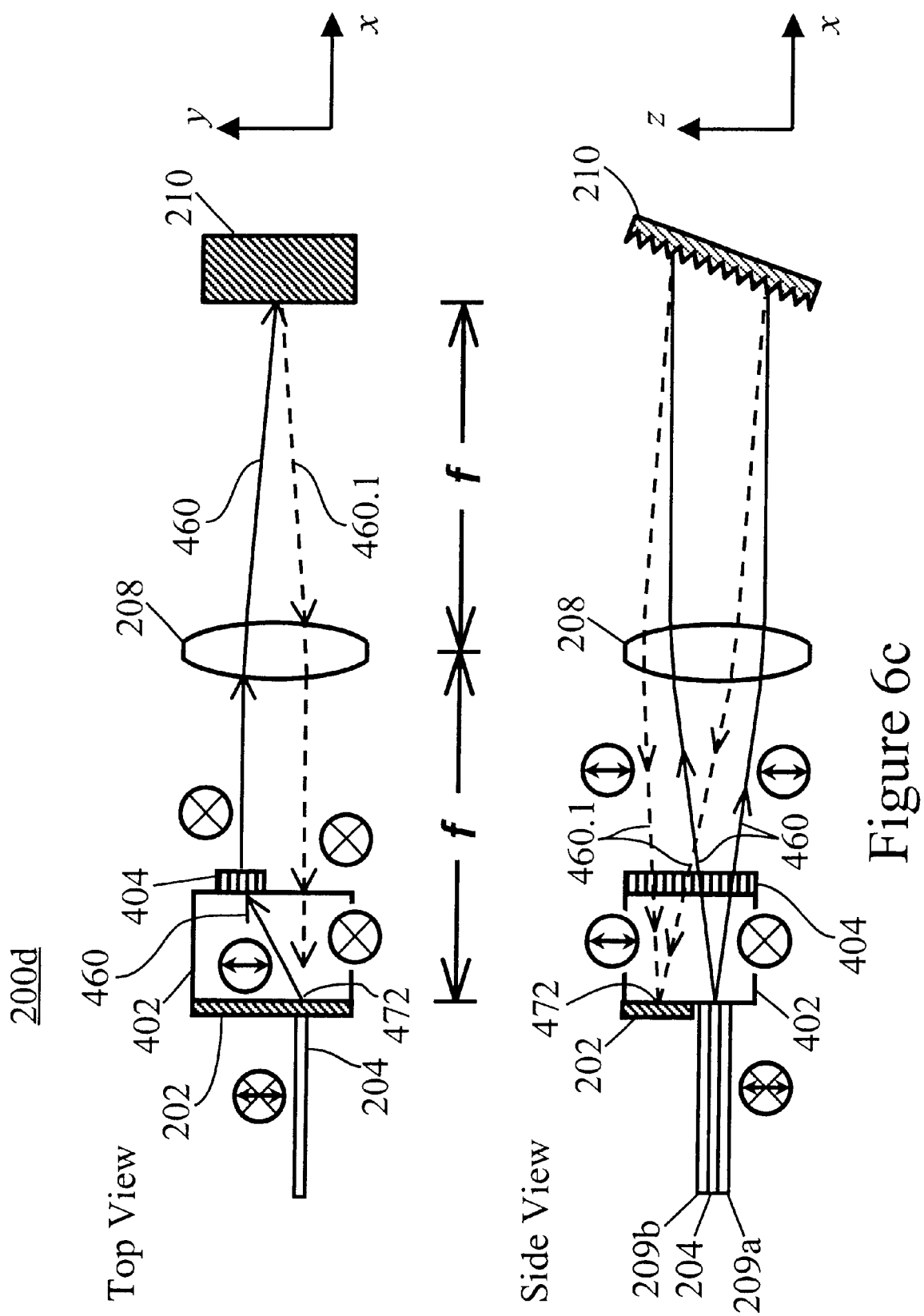
Figure 6D:
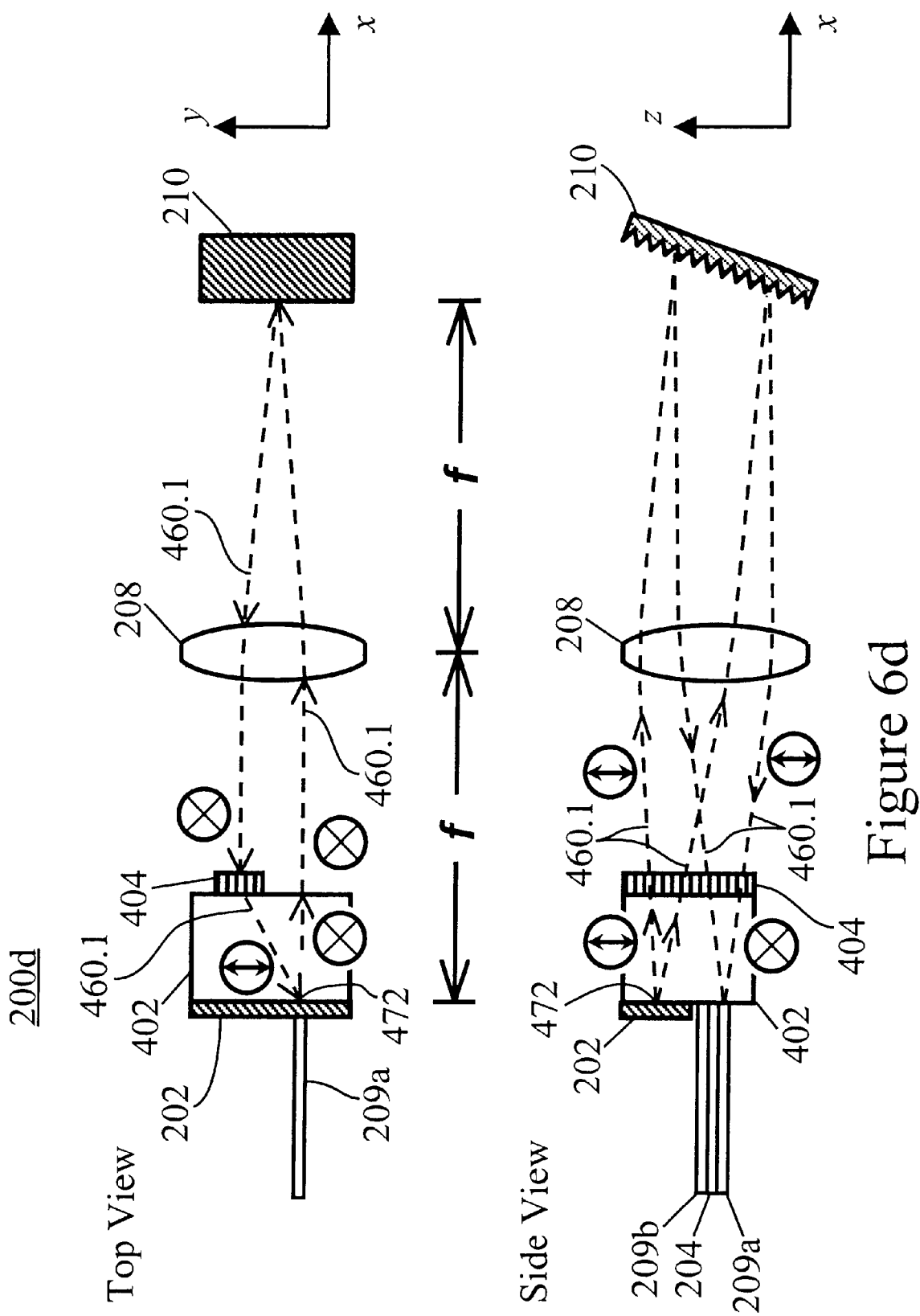

FIG. 5 illustrates a side view of a third preferred embodiment of an asymmetric channel separator in accordance with the present invention. The asymmetric channel separator 200c (FIG. 5) utilizes a reflector array 506 from which a first set of channels, such as the even channels, are reflected and through which the remaining channels (e.g., the odd channels) are transmitted. The reflector array 506 (FIG. 5) differs from the reflector array 202 (FIG. 3) through the absence of a second reflector. The reflector array 506 comprises the substrate plate 302 and the plurality of first reflectors 304.

Because one half of the channels are reflected from the reflector array 506 whilst the other half of the channels are transmitted through the reflector array 506, the asymmetric channel separator 200c comprises two gratings—a first grating 210a to disperse input light received from the input fiber 204 according to wavelength and to diffract a first set of channels back into the first output fiber 209a and a second grating 210b to diffract the second set of channels into the second output fiber 209b.

As shown in FIG. 5, the asymmetric channel separator 200c further comprises two sets of lenses—a first set of lenses 208a–208b optically coupled between the fibers 204, 209a–209b and the gratings 210a–210b and a second set of lenses 502a–502b optically coupled between the gratings 210a–210b and the reflector array 506. Each of the first lenses 208a–208b focuses a set of channels into a respective output fiber optically coupled to the lens. Additionally, the lens 208a collimates the light of a composite optical signal received from the input fiber 204. Each of the second lenses 502a–502b receives the diverging light of a respective set of channels from the reflector array 506 and collimates this light onto one of the gratings 210a–210b. Additionally, the lens 502a focuses the light of the composite optical signal onto the reflector array 506.

In operation of the asymmetric channel separator 200c, the lens 208a receives the diverging light of a composite optical signal 501 from the input fiber 204 and collimates this light onto the first grating 210a. The grating 210a spatially disperses the channels comprising the composite optical signal 501 according to their respective wavelengths. The paths of two such channels—the $\lambda_2$ channel and the $\lambda_3$ channel—are shown by dashed and dotted lines, respectively, in FIG. 5. The collimated channel lights diffracted by grating 210a are focused by lens 502a onto different respective points on the reflector array 506. The first reflectors 304 comprising reflector array 506 are disposed so as to only reflect one set of channels back to the lens 502a, for instance the even channels, whilst permitting the remaining channels to pass through to the lens 502b. After passing through and being collimated by one of the lenses 502a–502b, the reflected even channels (not shown for clarity) and the transmitted odd channels are diffracted by the grating 210a and the grating 210b, respectively. The even channels and the odd channels are then focused by lens 208a into output fiber 209a and by lens 208b into output fiber 209b, respectively.

The operation of the asymmetric channel separator 200c described immediately above may be subject to polarization dependent loss or insertion loss because of possible polarization-dependent throughput properties of the gratings 210a–210b. To counteract any such polarization related inefficiencies, the combination of a birefringent walk-off plate and a reciprocal optical rotator may optionally be optically coupled between the first lenses and the adjacent fibers. In FIG. 5, a first birefringent walk-off plate 503a and first 90° optical rotator 505a are optionally optically coupled between the lens 208a and the fibers 204 and 209a and a second birefringent walk-off plate 503b and second reciprocal optical rotator 505b are optionally optically coupled between the lens 208b and the fiber 209b.

The operation of the asymmetric channel separator 200c when the optional birefringent walk-off plates 503a–503b and reciprocal optical rotators 505a–505b are installed is similar to that described above with reference to FIG. 5 except that all signal light is linearly polarized with an orientation that permits maximum diffraction efficiency of the gratings 210a–210b. The first birefringent walk-off plate 503a separates the composite optical signal 501 into a linearly polarized first portion and a linearly polarized second portion, wherein the second portion is displaced from the first portion along a direction perpendicular to the plane of the drawing of FIG. 5. The first and second portions of composite optical signal 501 then project to the same positions on the plane of the drawing of FIG. 5. The first 90° optical rotator 505a then rotates the polarization orientation of the linearly polarized second portion so as to be parallel to that of the first portion. The polarization orientation of the first and second portions is such as to permit maximum diffraction efficiency of the gratings 210a–210b. The diffraction grating 210a–210b then diffracts the channels comprising the first portion and comprising the second portion of composite optical signal 501 such that each channel comprises two similarly polarized portions, one of which is offset from the other perpendicular to the plane of FIG. 5. The two portions of each channel then traverse through the asymmetric channel separator 200c as shown in FIG. 5, with the result that both portions of each even channel are reflected back to lens 502a, grating 210a and lens 208a by the reflector array 506 and both portions of each odd channel are transmitted through to lens 502b, grating 210b and lens 208b. Upon encountering either the reciprocal optical rotator 505a or the reciprocal optical rotator 505b, the polarization of one portion of each channel is rotated so as to be perpendicular to that of the other portion. The birefringent walk-off plates 503a–503b then recombine the first and second portions of each channel so both portions of each channel enter one of the output fibers 209a–209b.

FIGS. 6a–6d each illustrate both a top view and a side view of a fourth preferred embodiment of an asymmetric channel separator in accordance with present invention. The asymmetric channel separator 200d shown in FIGS. 6a–6d comprises all the same components as in the asymmetric channel separator 200b (FIGS. 4a–4d) except that the birefringent walk-off plate 402 and the reciprocal optical rotator 404 extend further in the vertical (z). dimension so as to be interposed between the lens 208 and the reflector array 202. In this configuration (FIGS. 6a–6d), all signal light passing through the asymmetric channel separator 200d passes twice through the birefringent walk-off plate 402 and once through the optical rotator 404 during each trip from the input fiber 204 to the reflector array 202 and, again, from the reflector array 202 to one of the output fibers 209a–209b. As a consequence, during each such trip, all signal light comprises an o-ray during one passage through the birefringent walk-off plate 402 and an e-ray during another passage through the birefringent walk-off plate 402. This configuration ensures that lights comprising the portions 450.1 and 460.1 of each channel travel along substantially identical optical path lengths through the apparatus 200d, thereby eliminating polarization mode dispersion.

An asymmetric optical channel separator which utilizes a diffraction grating has been disclosed. The separator receives a composite optical signal comprising channels with irregular inter-channels spacing and non-uniform bandwidths at an input port of a grating-based channel separator and outputs a first and a second subset of the channels, from a first and a second output port of the channel separator, respectively, wherein the first and second subsets are interleaved with one another. The separator thus is able to separate or combine optical channels comprising arbitrary spacing and non-uniform bandwidths so as to overcome bandwidth utilization inefficiencies of conventional regular spaced channel assignment schemes.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An apparatus, comprising:
   at least a first, second, and third optical fibers;
   at least one lens optically coupled to the first, second, and third optical fibers;
   at least one diffraction grating optically coupled to the at least one lens at a side opposite to the first, second, and third optical fibers; and
   a reflector array optically coupled to the at least one lens at a side opposite to the at least one diffraction grating, wherein the reflector array comprises:
   a substrate, and
   a plurality of first reflectors coupled to the substrate, wherein the plurality of first reflectors reflects a first subset of channels of a composite optical signal traversing the apparatus, wherein the subset of channels has irregular inter-channel spacings and non-uniform bandwidths.

2. The apparatus of claim 1, wherein the reflector array further comprises:
   at least one second reflector optically coupled to the substrate at a side opposite to the at least one lens, wherein the at least one second reflector reflects a second subset of channels of the composite optical signal.

3. The apparatus of claim 1, further comprising:
a birefringent walk-off plate optically coupled to the at least one lens at a side opposite to the at least one diffraction grating; and
an optical rotator optically coupled between the at least one lens and the birefringent walk-off plate.

4. The apparatus of claim 3, wherein the optical rotator rotates a polarization of a light traversing therethrough by approximately 90 degrees.

5. The apparatus of claim 1, wherein the at least one diffraction grating comprises:
a first diffraction grating optically coupled to the first and second optical fibers and the reflector array; and
a second diffraction grating optically coupled to the third optical fiber and the reflector array at a side opposite to the first diffraction grating.

6. The apparatus of claim 5, wherein the at least one lens comprises:
a first lens optically coupled between the first and second optical fibers and the first diffraction grating;
a second lens optically coupled between the third optical fiber and the second diffraction grating;
a third lens optically coupled between the first diffraction grating and the reflector array; and
a fourth lens optically coupled between the second diffraction grating and the reflector array.

7. The apparatus of claim 6, further comprising:
a first birefringent walk-off plate optically coupled to the first lens and the first optical fiber;
a first optical rotator optically coupled to the first birefringent walk-off plate and the first lens;
a second birefringent walk-off plate optically coupled to the third optical fiber and the second lens; and
a second optical rotator optically coupled to the second birefringent walk-off plate and the second lens.

8. An apparatus, comprising:
at least a first, second, and third optical fibers;
at least one lens optically coupled to the first, second, and third optical fibers;
at least one diffraction grating optically coupled to the at least one lens at a side opposite to the first, second, and third optical fibers; and
a reflector array optically coupled to the at least one lens at a side opposite to the at least one diffraction grating, wherein the reflector array comprises:
a substrate,
a plurality of first reflectors coupled to the substrate, wherein the plurality of first reflectors reflects a first subset of channels of a composite optical signal traversing the apparatus, and
at least one second reflector optically coupled to the substrate at a side opposite to the at least one lens, wherein the at least one second reflector reflects a second subset of channels of the composite optical signal traversing the apparatus, wherein the first and second subsets of channels have irregular inter-channel spacings and non-uniform bandwidths.

9. An apparatus, comprising:
at least a first, second, and third optical fibers;
at least one lens optically coupled to the first, second, and third optical fibers;
at least one diffraction grating optically coupled to the at least one lens at a side opposite to the first, second, and third optical fibers;
a reflector array optically coupled to the at least one lens at a side opposite to the at least one diffraction grating, wherein the reflector array comprises:
a substrate,
a plurality of first reflectors coupled to the substrate, wherein the plurality of first reflectors reflects a first subset of channels of a composite optical signal traversing the apparatus, and
at least one second reflector optically coupled to the substrate at a side opposite to the at least one lens, wherein the at least one second reflector reflects a second subset of channels of the composite optical signal traversing the apparatus, wherein the first and second subsets of channels have irregular inter-channel spacings and non-uniform bandwidths;
a birefringent walk-off plate optically coupled to the at least one lens at a side opposite to the at least one diffraction grating; and
an optical rotator optically coupled between the at least one lens and the birefringent walk-off plate.

10. An apparatus, comprising:
at least a first, second, and third optical fibers;
a first lens optically coupled to the first and second optical fibers;
a second lens optically coupled to the third optical fiber;
a first diffraction grating optically coupled to the first lens at a side opposite to the first and second optical fibers;
a second diffraction grating optically coupled to the second lens at a side opposite to the third optical fiber;
a third lens optically coupled to the first diffraction grating;
a fourth lens optically coupled to the second diffraction grating;
a reflector array optically coupled to the third and fourth lenses, wherein the reflector array comprises:
a substrate, and
a plurality of reflectors coupled to the substrate, wherein the plurality of reflectors reflects a subset of channels of a composite optical signal traversing the apparatus, wherein the subset of channels has irregular inter-channel spacings and non-uniform bandwidths.

11. The apparatus of claim 10, further comprising:
a first birefringent walk-off plate optically coupled to the first lens and the first optical fiber;
a first optical rotator optically coupled to the first birefringent walk-off plate and the first lens;
a second birefringent walk-off plate optically coupled to the third optical fiber and the second lens; and
a second optical rotator optically coupled to the second birefringent walk-off plate and the second lens.

12. A method for de-multiplexing a composite optical signal, comprising the steps of:
(a) directing a composite optical signal to a diffraction grating, wherein the composite optical signal comprises a plurality of channels with irregular inter-channel spacings and non-uniform bandwidths;
(b) spatially dispersing the plurality of channels into a first subset of channels and a second subset of channels interleaved with the first subset of channels utilizing the diffraction grating;
(c) reflecting the first and second subsets to the diffraction grating utilizing a reflector array, wherein the reflector array comprises:
a substrate optically coupled to the diffraction grating,
a plurality of first reflectors coupled to the substrate, wherein the plurality of first reflectors reflects the first subset of channels, and
at least one second reflector optically coupled to the substrate at the side opposite to the diffraction grating, wherein the at least one second reflector reflects the second subset of channels; and (d) reflecting the first subset of channels from the diffraction grating to a first optical fiber and reflecting the second subset of channels from the diffraction grating to a second optical fiber.

13. A method for multiplexing a plurality of channels, comprising the steps of:

(a) directing a first subset of channels and a second subset of channels interleaved with the first set of channels to a diffraction grating, wherein the first and second subsets of channels have irregular inter-channel spacings and non-uniform bandwidths;

(b) reflecting the first and second subsets of channels from the diffraction grating to a reflector array, wherein the reflector array comprises:
a substrate optically coupled to the diffraction grating,
a plurality of first reflectors coupled to the substrate, wherein the plurality of first reflectors reflects the first subset of channels to the diffraction grating, and
at least one second reflector optically coupled to the substrate at the side opposite to the diffraction grating, wherein the at least one second reflector reflects the second subset of channels to the diffracting grating; and (c) reflecting the first and second subsets of channels from the diffraction grating to an optical fiber, wherein the first and second subsets of channels are combined into a composite optical signal.

14. A method for de-multiplexing a composite optical signal, comprising the steps of:

(a) separating the composite optical signal into a first sub-light and a second sub-light, wherein the first and second sub-lights have mutually orthogonal linear polarizations, wherein the first and second sub-lights each comprises a plurality of channels with irregular inter-channels spacings and non-uniform bandwidths;

(b) rotating a polarization of either the first or the second sub-light, wherein the first and second sub-lights are similarly polarized;

(c) directing the first and second sub-lights in a forward direction to a diffraction grating;

(d) spatially dispersing the first and second sub-lights into a first subset of channels and a second subset of channels interleaved with the first subset of channels utilizing the diffraction grating;

(e) reflecting the first and second subsets to the diffraction grating utilizing a reflector array, wherein the reflector array comprises:
a substrate optically coupled to the diffraction grating,
a plurality of first reflectors coupled to the substrate, wherein the plurality of first reflectors reflects the first subset of channels, and
at least one second reflector optically coupled to the substrate at the side opposite to the diffraction grating, wherein the at least one second reflector reflects the second subset of channels;

(f) reflecting the first and second subsets from the diffraction grating;

(g) rotating a polarization of either the second or the first sub-light, wherein the first and second sub-lights have mutually orthogonal linear polarizations; and (h) directing the first subset of channels to a first optical fiber and directing the second subset of channels to a second optical fiber.

15. A method for multiplexing a plurality of channels, comprising the steps of:

(a) separating a first subset of channels and a second subset of channels interleaved with the first subset of channels into a first sub-light and a second sub-light, wherein.the first and second sub-lights have mutually orthogonal linear polarizations;

(b) rotating a polarization of either the first or the second sub-light, wherein the first and second sub-lights are similarly polarized;

(c) directing the first and second subsets of channels to a diffraction grating;

(d) reflecting the first and second subsets of channels from the diffraction grating to a reflector array, wherein the reflector array comprises:
a substrate optically coupled to the diffraction grating,
a plurality of first reflectors coupled to the substrate, wherein the plurality of first reflectors reflects the first subset of channels to the diffraction grating, and
at least one second reflector optically coupled to the substrate at the side opposite to the diffraction grating, wherein the at least one second reflector reflects the second subset of channels to the diffraction grating;

(e) reflecting the first and second subsets of channels from the diffraction grating;

(f) rotating a polarization of either the second or the first sub-light, wherein the first and second sub-lights have mutually orthogonal linear polarizations;

(g) directing the first and second subsets of channels to an optical fiber, wherein the first and second subsets of channels are combined into a composite optical signal.

16. A method for de-multiplexing a composite optical signal, comprising the steps of:

(a) directing a composite optical signal to a first diffraction grating, wherein the composite optical signal comprises a plurality of channels with irregular inter-channel spacings and non-uniform bandwidths;

(b) spatially dispersing the plurality of channels into a first subset of channels and a second subset of channels interleaved with the first subset of channels utilizing the first diffraction grating;

(c) reflecting the first subset of channels to the first diffraction grating utilizing a reflector array, wherein the reflector array comprises:
a substrate, and
a plurality of reflectors coupled to the substrate and optically coupled to the first diffraction grating;

(d) directing the second subset of channels to a second diffraction grating;

(e) reflecting the first subset of channels from the first diffraction grating to a first optical fiber and reflecting the second subset of channels from the second diffraction grating to a second optical fiber.

17. A method for multiplexing a plurality of channels, comprising the steps of:

(a) directing a first subset of channels to a first diffraction grating and a second subset of channels interleaved with the first set of channels to a second diffraction grating, wherein the first and second subsets of channels have irregular inter-channel spacings and non-uniform bandwidths;

(b) reflecting the first subset of channels from the first diffraction grating to a reflector array, and reflecting the second subset of channels from the second diffraction grating to the reflector array, wherein the reflector array comprises:
a substrate optically coupled to the second diffraction grating, and
a plurality of reflectors coupled to the substrate and optically coupled to the first diffraction grating;

(c) reflecting the first subset of channels from the reflector array to the first diffraction grating;

(d) directing the second subset of channels from the reflector array to the first diffraction grating; and
(e) reflecting the first and second subsets of channels from the first diffraction grating to an optical fiber, wherein the first and second subsets of channels are combined into a composite optical signal.

* * * * *